United States Patent
Catton

[11] Patent Number: 5,988,333
[45] Date of Patent: Nov. 23, 1999

[54] BRAKE FLUID BLOCKING VEHICLE THEFT PREVENTION SYSTEM

[76] Inventor: Douglas Joseph Catton, 8653 Caribbean Ct., Las Vegas, Nev. 89117

[21] Appl. No.: 08/891,488

[22] Filed: Jul. 11, 1997

[51] Int. Cl.[6] ................................................. B60T 11/00
[52] U.S. Cl. .......................... 188/353; 188/265; 303/89
[58] Field of Search ..................... 303/89, 119.2, 303/84.1, 84.2; 188/353, 151 A, 265; 137/598, 625.65, 596.16, 625.64; 180/287; 251/129.21, 80, 85, 120, 129.15, 129.22, 129.11; 477/196, 201; 192/219.1, 13 A

[56] References Cited

U.S. PATENT DOCUMENTS

| | | | |
|---|---|---|---|
| 2,080,603 | 5/1937 | Cometto et al. | 188/265 |
| 2,217,141 | 10/1940 | Sprenkle | 188/353 |
| 2,262,842 | 11/1941 | Goepfrich | 188/353 |
| 2,296,132 | 9/1942 | Wiseley | 188/353 |
| 2,502,118 | 3/1950 | Ashton et al. . | |
| 2,638,118 | 5/1953 | Chandler | 188/353 |
| 2,762,476 | 9/1956 | Gaylord et al. | 188/353 |
| 3,303,910 | 2/1967 | Gavillet | 188/152 |
| 3,450,158 | 6/1969 | Tilney et al. | 188/353 |
| 3,803,551 | 4/1974 | Jordan | 340/64 |
| 3,882,959 | 5/1975 | Hsieh | 180/114 |
| 3,885,586 | 5/1975 | Tibbetts | 137/354 |
| 3,973,805 | 8/1976 | Stevenson et al. | 303/9 |
| 4,018,314 | 4/1977 | Richmond et al. | 188/353 |
| 4,040,675 | 8/1977 | Richmond et al. | 303/89 |
| 4,300,057 | 11/1981 | Crosas | 307/10 |
| 4,429,711 | 2/1984 | Shomer | 137/385 |
| 4,446,950 | 5/1984 | Wise et al. | 192/3 |
| 4,495,910 | 1/1985 | Taylor | 123/198 |
| 4,540,154 | 9/1985 | Kolchinsky et al. | 251/129.15 |
| 4,579,202 | 4/1986 | McIntosh | 192/0.09 |
| 4,633,686 | 1/1987 | Carr | 70/179 |
| 4,640,391 | 2/1987 | Maehara et al. | 188/353 |
| 4,678,068 | 7/1987 | Matthews et al. | 188/353 |
| 4,721,192 | 1/1988 | Cano et al. | 188/353 |
| 4,790,345 | 12/1988 | Kolchinsky | 137/269 |
| 4,793,661 | 12/1988 | Munro | 303/89 |
| 4,873,824 | 10/1989 | Cox | 60/545 |
| 4,881,615 | 11/1989 | Conway | 180/287 |
| 4,925,252 | 5/1990 | Hee | 188/353 |
| 4,928,506 | 5/1990 | Radziewicz | 70/176 |
| 4,951,776 | 8/1990 | Jeter | 180/287 |
| 4,964,677 | 10/1990 | Splinter | 303/89 |
| 5,154,493 | 10/1992 | Futrell et al. | 303/89 |
| 5,163,741 | 11/1992 | Hsiu | 303/89 |
| 5,335,758 | 8/1994 | Zalesky | 188/353 |
| 5,344,221 | 9/1994 | MacWilliam | 303/89 |
| 5,351,781 | 10/1994 | Pritchard et al. | 180/287 |

*Primary Examiner*—Douglas C. Butler
*Attorney, Agent, or Firm*—Weide & Associates

[57] ABSTRACT

A vehicle anti-theft device that blocks and unblocks the flow of hydraulic fluid between a vehicle's master brake cylinder and wheel brake cylinder. When the invention is in a fluid blocking position, it locks the brakes and prevents movement of the vehicle on its wheels. Conversely, when the invention is in the nonblocking position, the brakes are unlocked and the wheels turn freely as in normal operation. The anti-theft device can be deactivated within the vehicle or by remote control.

14 Claims, 1 Drawing Sheet

BRAKE FLUID BLOCKING VEHICLE THEFT PREVENTION SYSTEM

FIELD OF INVENTION

This invention relates to vehicle anti-theft devices, specifically to an improved brake locking mechanism to prevent theft of vehicles.

BACKGROUND OF PRIOR ART

Vehicle theft continues to increase in society today with added expense to consumers in insurance cost, time loss and inconvenience. Consumers are looking for vehicles that are more secure from theft. Insurance companies are offering premium discounts for vehicles equipped with different types of vehicle anti-theft devices, such as steering wheel locking devices, alarm systems, and ignition switches which use electronically controlled keys, etc.

There are many different types of vehicle anti-theft devices to deter thieves. Some are intended to audibly alert the owner of a vehicle that their vehicle is being tampered with, and are of the alarm or noise making type. Some inventions are anti-theft devices which lock the vehicle steering system in an attempt to prevent theft. Other anti-theft devices close off the fuel supply to prevent theft. If a vehicle equipped with such a device were stolen, it could be driven only a few blocks before running out of the remaining fuel in its fuel line.

Some inventions are used in conjunction with the vehicle hydraulic brake system to prevent theft. The following are a few examples: U.S. Pat No. 4,873,824 issued to Cox explains an anti-theft brake locking mechanism placed between the master cylinder and the brake actuator, that can be operated from the driver area, by key or combination mechanism. The mechanism can lock mechanically or electronically. Although this device appears to fulfill the function of locking the brakes, it appears to lack the ability to lock the brakes if the brakes are out of adjustment. Also, it would entail elimination of the brake light pressure switch with added cost of a mechanical switch added to the system. If the pressure switch were not eliminated, the brake lights would remain on while the mechanism was operational, thus discharging the battery.

U.S. Pat No. 4,951,776 issued to Jetter explains an anti-theft system that includes an actuating means to temporarily disable a vehicle from theft. This invention assembly has a solenoid valve which is installed in the hydraulic brake system. When the solenoid is energized, the valve is open and the brake system operates in a normal manner. When the assembly is de-energized, the valve closes and prevents the release of the brakes. This invention appears to have the ability to lock the brakes, except that it has a self-equalizing drawback. This drawback allows the brake pressure trapped between the brake drum (or rotor) and the invention to dissipate in approximately one hour, thereby allowing the brakes to release. This defeats the anti-theft function.

U.S. Pat No. 5,351,781 issued to Pritchard et al., explains an anti-theft device consisting of a housing unit located between the master cylinder and proportioning valve. The housing unit has a fluid blocking means to block and unblock the flow of brake fluid. It is controlled by a 12 volt DC motor which is actuated between limit switches to open and close the valve. Although this invention attempts to fulfill its intended purpose, the problem of having many mechanical and electrical moving parts could lead to premature failure. Additionally, this factor increases manufacturing costs.

OBJECTS AND ADVANTAGES

Accordingly, several objects and advantages are:
(a) to provide an anti-theft device that will lock the brakes, even if they are out of adjustment.
(b) to provide an anti-theft device that will not lose its hydraulic brake holding anti-theft mode in a short period of time.
(c) to provide an anti-theft device with a built-in safety element which prevents a vehicle from being moved until the brake pedal is depressed;
(d) to provide an anti-theft device that is easy to use—turn off the key and depress the brake pedal;
(e) to provide an anti-theft device at a reduced manufacturing cost;
(f) to provide an anti-theft device that is simple and reliable;
(g) to provide an anti-theft device that is easier to integrate and install;
(h) to provide an anti-theft device that has fewer moving parts and is less complicated;
(i) to provide an anti-theft device that once activated, should remain in the anti-theft position by maintaining adequate brake pressure between the brake drums (or rotors) and the invention at all times while activated.
(j) to provide an anti-theft device that has only a few assembly parts, and a few moving parts therefore making it very dependable.
(k) to provide an anti-theft device that can be used in conjunction with a vehicle anti-lock braking system, or a conventional braking system.
(l) to provide an anti-theft device that can be installed in newly manufactured vehicles, or retrofitted to used vehicles.
(m) to provide an anti-theft device that can be utilized on different types of vehicles including automobiles, trucks, buses, airplanes, fork lifts, tractors or most vehicles with a hydraulic brake system.
(n) to provide an anti-theft device that can be used in conjunction with the automobile industry's brake transmission shift interlock system, in that you cannot move the gear selector into gear until the brake pedal is depressed.

Further objects and advantages will become apparent from a consideration of the ensuing descriptions and drawings.

DRAWING FIGURES

REFERENCE NUMERALS AND DRAWINGS

| 8 | bi-directional orifice | 10 | bi-directional orifice |
|---|---|---|---|
| 12 | sealable orifice | 14 | front housing |
| 16 | back housing | 18 | slidable plunger |
| 20 | spring | 22 | fluid flow channel |
| 24 | longitudinal bore | 26 | machine threads(f) |
| 26 | machine threads(m) | 28 | housing seal |
| 30 | solenoid | 32 | flow cavity |
| 34 | solenoid seat | 36 | plunger stop |

SUMMARY

The present invention consists of a fluid blocking mechanism which traps and holds fluid pressure in a vehicle's brake system to enable an anti-theft brake-locking mode. By unblocking the fluid in the vehicle's brake system, a normal operating mode is resumed.

DESCRIPTION OF INVENTION—FIGS. 1 & 2

Figure 1:
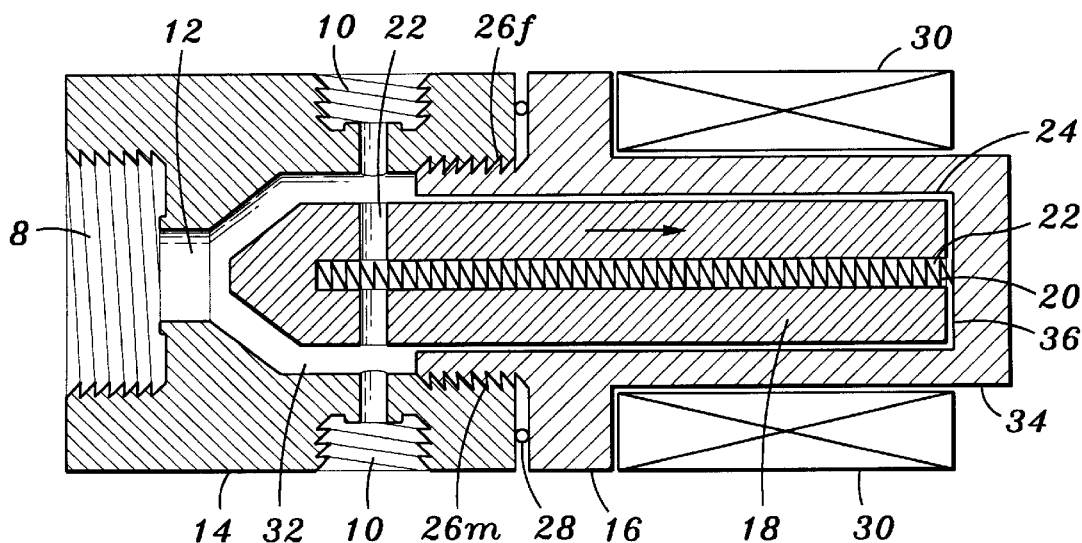
FIG. 1 shows a side sectional longitudinal view of the fluid blocking mechanism in the open, or unblocking position.
Figure 2:
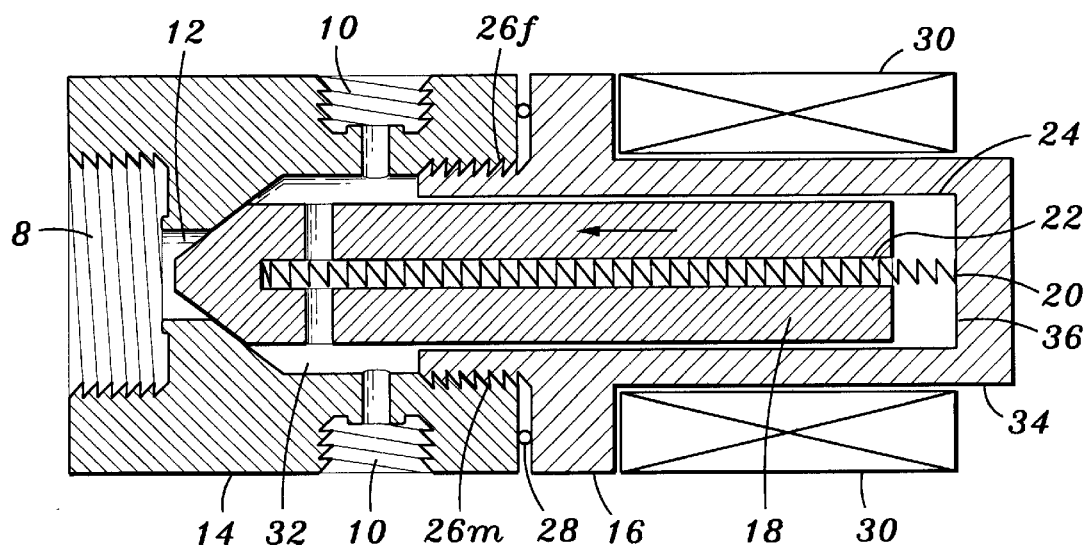
FIG. 2 shows a side sectional longitudinal view of the fluid blocking mechanism in the closed, or blocking position.

FIG. 1 and FIG. 2 refer to a front housing 14 and a back housing 16 which contain a sealable orifice 12, a longitudinal bore 24, a slidable plunger 18, a flow cavity 32, a spring 20, a bi-directional orifice 8, and a bi-directional orifice 10. The slidable plunger 18 has a fluid flow channel 22 within it. The spring 20 is within the slidable plunger 18 fluid flow channel 22. The spring 20 seats on a plunger stop 36, at the end of the longitudinal bore 24, which is at the opposite end of the sealable orifice 12. FIG. 1 shows the invention in an open position. FIG. 2 shows the invention in a closed position.

FIG. 1 and FIG. 2 is a back housing exterior containing a solenoid 30, a solenoid seat 34, a machine thread 26(m), a housing seal 28, the front housing 14, and a machine thread 26(f).

OPERATION

The present invention has similarities to other patented mechanisms in systems which lock and unlock a vehicle's brakes. This mechanism differs, and is a significant improvement, in that it has a safety element which locks the brakes until the mechanism solenoid 30 is electrically energized and the brake pedal is depressed. For example, with an automatic transmission, if the gear selector is moved into the drive position and the gas pedal is depressed, the vehicle should not move until the anti-theft mode is deactivated. Another aspect of the present invention is that the trapped fluid pressure urges the slidable plunger 18 into the sealable orifice 8, maintaining the sealing effect from its own trapped fluid back pressure.

The operation of the present invention is conducted within a front housing 14, a back housing 16, the exterior of a front housing 14, and the exterior of a back housing 16. When the invention is electrically activated to a fluid-unblocking position (in response to the application of voltage to electrically energize a solenoid 30), creating an electromagnetic field, a slidable plunger 18 is urged against a spring 20 to a plunger stop 36. This allows fluid to pass from a bi-directional orifice 8, through a sealable orifice 12, through a flow cavity 32, and out of a bi-directional orifice 10 to a brake cylinder when brake pedal pressure is applied.

Conversely, while the solenoid 30 is still energized, fluid flows back through the bi-directional orifice 10, through the flow cavity 32, through the sealable orifice 12, out of a bi-directional orifice 8, back to the master cylinder when the brake pedal is released. In the present invention's electrically activated unblocking state, the electromagnetic force of the solenoid 30 holds the slidable plunger 18 against the plunger stop 36 in a bi-directional fluid unblocking position. This allows normal flow of fluid through the invention allowing normal operation of the vehicle.

When the present invention is not activated electrically, there is no electromagnetic field to urge the slidable plunger 18 against the plunger stop 36. Therefore, the spring 20 urges the slidable plunger 18 toward the sealable orifice 12 to seal the sealable orifice 12. However, when the brake pedal is depressed, without activation of the solenoid 30, the fluid pressure in the master cylinder pushes the fluid through the bi-directional orifice 8, and through the sealable orifice 12. This fluid pressure urges the slidable plunger 18 against the spring 20, away from the sealable orifice 12, allowing fluid to flow through the sealable orifice 12, and through the bi-directional orifice 10 to the brake cylinder. Fluid that passes between the slidable plunger 18 and the longitudinal bore 24 is equalized through a fluid flow channel 22 within slidable plunger 18 back to the flow cavity 32. This allows fluid to pass through the bi-directional orifice 10 to the brake cylinder engaging the brakes. Once adequate brake fluid pressure is achieved to lock the brakes, the slidable plunger 18 has equal fluid pressure around it. The spring 20 urges the slidable plunger 18 forward to the sealable orifice 12. The fluid back pressure urges the slidable plunger 18 to retain a tight seal. This should maintain the pressure of the trapped fluid and sustain the brakes in a locked position.

To release the trapped fluid back pressure, and therefore the brakes, the solenoid 30 is electrically energized, creating an electromagnetic field to urge the slidable plunger 18 against the spring 20. The solenoid 30 can be energized from within the vehicle or remotely through various means. The solenoid 30 does not create enough electromagnetic force to urge the slidable plunger 18 against the trapped fluid back-pressure. When the brake pedal is depressed, the fluid pressure overrides the existing fluid back-pressure trapped between the sealable orifice 12 and the brake cylinder. This creates equal fluid pressure within the invention, allowing the solenoid 30 to urge the slidable plunger 18 against the spring 20, to the plunger stop 36, holding it there electromagnetically. This allows the trapped fluid to escape back to the master cylinder, once the brake pedal is released. Now the vehicle can be operated in a normal manner (allowing bi-directional fluid movement) as long as the invention remains electrically energized, and the slidable plunger 18 is held against the plunger stop 36 in a fluid-unblocking position.

SUMMARY, RAMIFICATIONS AND SCOPE

This theft prevention system can be adapted to most new and used vehicles, and includes a built-in safety function. Once the invention is activated, and set in a brake locking anti-theft mode, the brakes cannot be released until the brake pedal is depressed. This aspect assures safety in that a gear selector moved into the drive position, or a clutch pedal released, should not allow the vehicle to move. It can also be produced inexpensively and requires only a few parts to complete each device. Furthermore, the present invention has the advantages that:

a vehicle cannot be physically moved on its own wheels once the invention is active.

it is easily activated and deactivated;

it has long life and reliability with only a few moving parts;

it is compatible with different types of deactivation methods and devices.

Although the description above contains many specificities, these should not be construed as limiting the scope of the invention but as merely providing illustrations of some of the presently preferred embodiments. For example, the anti-theft device can have other shapes such as square, oval, triangular, etc.; the sealable orifice can be of many types of seals; the slidable plunger can be of different sizes or shapes; the front and back housings can be joined by different means such as welding or pressed fit, etc. Thus, the scope of the invention should be determined by the appended claims and their legal equivalents, rather than by the examples given.

I claim:

1. A vehicle anti-theft system for a vehicle having a brake system with a brake fluid reservoir, at least one braking mechanism, a fluid line connecting the reservoir with the at least one braking mechanism, and an actuation element for engaging the at least one braking mechanism with brake fluid from the reservoir, said system comprising a fluid flow control element positioned along said fluid line between said reservoir and said at least one braking mechanism, said fluid flow control element including a housing, at least one inlet in communication with said line leading to said reservoir and at least one outlet in communication with said line leading to said at least one braking mechanism, an interior chamber in communication with said at least one fluid inlet through an orifice and in communication with said at least one fluid outlet, a plunger movably positioned in said interior chamber and moveable between a first position in which a portion of said plunger obstructs said orifice and a second position in which said plunger does not obstruct said orifice, means for biasing said plunger into said first position and an electromagnetic element for biasing said plunger towards said second position when a voltage is applied thereto, said braking mechanism held in an engaged state when a voltage is not applied to said electromagnetic element and said actuation element is actuated and fluid is caused to flow from said reservoir through said orifice into said interior chamber and to said braking mechanism until a pressure of fluid on each side of said orifice is nearly equal and said means for biasing causes said plunger to obstruct said orifice and prevent the flow of fluid therethrough, said braking mechanism being released when a voltage is applied to said electromagnetic element and said actuation element is actuated and said electromagnetic element, assisted by fluid pressure provided by said actuation element, causes said plunger to move away from said orifice, permitting fluid to flow from said braking mechanism through said fluid flow element towards said reservoir.

2. The vehicle anti-theft system in accordance with claim 1 wherein said interior chamber has a first end and a second end and said orifice is provided at said first end.

3. The vehicle anti-theft system in accordance with claim 1 wherein said plunger has a first end and a second end and a flow passage extending therethrough generally perpendicular to a line extending through said first and second ends.

4. The vehicle anti-theft system in accordance with claim 3 wherein said housing has two outlets, a first outlet generally aligned with a first side of said flow passage through said plunger and a second outlet generally aligned with a second side of said flow passage through said plunger when said plunger is in said second position.

5. The vehicle anti-theft system in accordance with claim 1 wherein said means for biasing comprises a spring.

6. The vehicle anti-theft system in accordance with claim 1 wherein said plunger has a first end and a second end and an equalization passage leading to said second end permitting fluid to flow to a portion of said interior chamber adjacent said second end of said plunger for equalizing a pressure of said fluid in said chamber at each end of said plunger.

7. The vehicle anti-theft system in accordance with claim 1 wherein said electromagnetic element comprises a solenoid.

8. A method of locking and unlocking a brake system of a vehicle having a brake fluid reservoir, at least one braking mechanism, a fluid line connecting the reservoir with the at least one braking mechanism, and an actuation element for engaging the at least one braking mechanism with brake fluid from the reservoir, a fluid flow control element positioned along said fluid line between said reservoir and said at least one braking mechanism, said fluid flow control element including a housing, at least one inlet in communication with said line leading to said reservoir and at least one outlet in communication with said line leading to said at least one braking mechanism, an interior chamber in communication with said at least one fluid inlet through an orifice and in communication with said at least one fluid outlet, a plunger movably positioned in said interior chamber and moveable between a first position in which a portion of said plunger obstructs said orifice and a second position in which said plunger does not obstruct said orifice, means for biasing said plunger into said first position and an electromagnetic element for biasing said plunger towards said second position when a voltage is applied thereto, comprising the steps of:

de-activating a voltage applied to said electromagnetic element;

actuating said actuation element, causing fluid to flow from said reservoir through said orifice into said interior chamber and to said braking mechanism;

causing a pressure of said brake fluid on each side of said orifice to generally equalize;

moving said plunger with said means for biasing into a position in which said plunger obstructs said orifice and prevents the flow of fluid therethrough, locking said braking mechanism;

applying a voltage to said electromagnetic element; and actuating said actuation element to cause a fluid pressure, in assistance with a force generated by said electromagnetic element to cause said plunger to move away from said orifice, permitting fluid to flow from said braking mechanism through said fluid flow element towards said reservoir, releasing said braking element.

9. The method in accordance with claim 8 wherein said step of causing a pressure of said brake fluid on each side of said orifice to generally equalize includes the step of permitting fluid to flow through an equalization passage through said plunger to an end of said interior chamber generally opposite said orifice.

10. The method in accordance with claim 8 including the step of maintaining a voltage applied to said electromagnetic element to maintain said plunger in said second position.

11. A vehicle anti-theft system for a vehicle having a brake system with a brake fluid reservoir, at least one wheel braking mechanism, a fluid line connecting the reservoir with the at least one braking mechanism, and an actuation element for engaging the at least one braking mechanism with brake fluid from the reservoir, said system comprising a fluid flow control element positioned along said fluid line between said reservoir and said at least one braking mechanism, said fluid flow control element including a housing, at least one inlet in communication with said line leading to said reservoir and at least one outlet in communication with said line leading to said at least one braking mechanism, an interior chamber in communication with said at least one fluid inlet through an orifice and in communication with said at least one fluid outlet, a plunger movably positioned in said interior chamber and moveable between a first position in which a portion of said plunger obstructs said orifice and a second position in which said plunger does not obstruct said orifice, electromagnetic means for generating a force sufficient to move said plunger into said second position when a fluid pressure is applied to said plunger through said inlet by actuation of said actuation element and biasing means for moving said plunger to said first position when said electromagnetic means is not generating said force and once a pressure of fluid on each side of said orifice is substantially equalized.

12. The vehicle anti-theft system in accordance with claim 11 wherein said biasing means comprise a spring.

13. The vehicle anti-theft system in accordance with claim 11 wherein said interior chamber has a first end and a second end and said plunger has a first end and a second end and said plunger divides said interior chamber into a first portion between said first end of said plunger and said first end of said chamber and a second portion between said second end of said plunger and a second end of said chamber and wherein said plunger includes a passage extending through a portion thereof whereby fluid may pass from said first portion to said second portion of said chamber.

14. The vehicle anti-theft system in accordance with claim 11 wherein said electromagnetic element comprises a solenoid.

* * * * *